J. CROMPTON AND W. GALLAGHER.
CALCULATING DEVICE.
APPLICATION FILED MAR. 8, 1920.

1,424,344.

Patented Aug. 1, 1922.
2 SHEETS—SHEET 1.

INVENTORS:-
James Crompton
William Gallagher
BY THEIR ATTORNEYS: Walter Gunn

J. CROMPTON AND W. GALLAGHER.
CALCULATING DEVICE.
APPLICATION FILED MAR. 8, 1920.

1,424,344.

Patented Aug. 1, 1922.
2 SHEETS—SHEET 2.

INVENTORS.
James Crompton
William Gallagher.
BY THEIR ATTORNEY. Walter Gunn

UNITED STATES PATENT OFFICE.

JAMES CROMPTON, OF LONDON, AND WILLIAM GALLAGHER, OF MANCHESTER, ENGLAND.

CALCULATING DEVICE.

1,424,344.     Specification of Letters Patent.    Patented Aug. 1, 1922.

Application filed March 8, 1920. Serial No. 364,328.

(GRANTED UNDER THE PROVISIONS OF THE ACT OF MARCH 3, 1921, 41 STAT. L., 1313.)

*To all whom it may concern:*

Be it known that we, JAMES CROMPTON and WILLIAM GALLAGHER, both subjects of the King of Great Britain and Ireland, and residents of London and Manchester, England, respectively, have invented a Calculating Device (for which we have filed application in Great Britain March 6, 1919, Patent Number 128,878), of which the following is a specification.

This invention relates to an apparatus for calculating the thermal efficiency of a steam generating plant and other data incidental to and involved in the process of determining the said thermal efficiency from the observations and readings commonly taken for that purpose.

The invention will be described by the aid of the accompanying drawings wherein:—

Fig. 1 is a general view of the improved apparatus of which Fig. 2 is an end view while Fig. 3 is a view of a transversely moving member carrying a chart shown detached.

Figure 1:
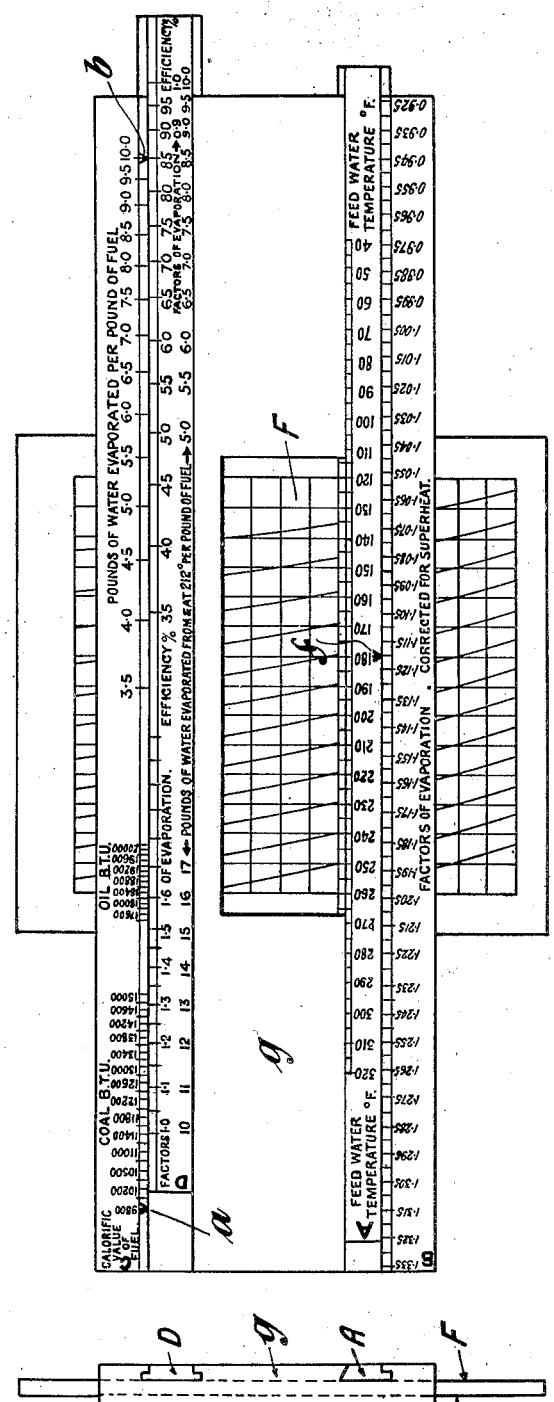
Figure 2:
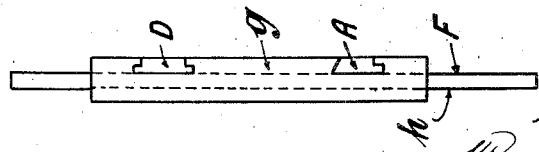

According to the invention the apparatus or instrument comprises a flat rectangular frame or stock $g$ usually made of wood in which are slidably mounted two scales A and D and upon which are marked the fixed scales B and C and, if desired, the additional scale E.

The sliding scales A, D move longitudinally relatively to the frame $g$ and the latter is provided with a transverse slot or groove. A carrier $h$ for a chart F is slidably mounted in the before-mentioned transverse slot and said slot is so arranged that the chart F lies below the sliding scales A, D, an opening being formed in the frame $g$ to expose the desired section of the chart F, one edge of the opening being bounded by the scale A. The marks on said sliding scale A are continued down its inner edge in order to bring them into close proximity to the chart F. As the scale A and chart F are capable of movement at right angles to each other any point on the edge of the scale A can be brought into register with any point on the chart F.

The chart F shown separately in Fig. 3 consists of a square, or rectangle, across which is drawn a series of lines and curves.

The proper position of the various lines on the chart is determined as follows:— On the right hand boundary of the square or rectangle, is marked off a series of points, dividing it into a number of equal parts. From these points is drawn across the square or rectangle, a series of lines parallel to the top and bottom boundaries.

Along the right-hand edge of the rectangle these lines are designated "Boiler pressure lbs. per sq. in." and are numbered accordingly, and along the left-hand edge, each line is numbered according to the temperature of saturated steam at the particular boiler pressure which it represents. In a similar manner a series of lines are drawn from the top to the bottom, and parallel to the right and left hand boundaries of the square or rectangle. These are designated "Total heat of superheated steam B. T. U." and are numbered accordingly along the top edge of the rectangle.

Across the rectangle and running from the top to the bottom boundaries is also drawn a series of curves the one on the extreme right being designated "Saturation curve" and the others "Superheat curves." Their positions are determined by existing formulæ for calculating the total heat of steam, or from existing charts and tables on the properties of steam, and each is numbered according to the degrees of superheat above saturation temperature, which it represents.

The slide A carries on its upper edge a scale of equal divisions designated "Feed water temperature ° F." which are numbered accordingly in increasing magnitude from right to left. These divisions are marked off to the same scale as those on the upper and lower edges of the chart, so that the lineal dimension representing a certain number of heat units on the latter, is equal to the lineal dimension representing a similar number of degrees of temperature on the scale A. The lower edge of slide A carries a mark or pointer $f$.

Below scale A and running parallel to it, is a fixed scale of equal divisions B designated "Factors of evaporation."

The scales D and C are independent of the foregoing as regards their position and could form a separate apparatus. They are arranged as shown in the drawings for convenience of manipulation.

Slide D carries upon its upper edge a logarithmic scale similar to those used in calculating instruments commonly known as "slide rules"; that is to say, that the distance of each point from the left-hand extremity of the scale represents to some definite scale the logarithm of some number either whole or decimal.

The marks of the scale are numbered with two rows of figures except at the extreme right, where there are three rows. Those of the upper row on the left hand end of the scale, and the middle row on the right are designated "Factors of evaporation." Those of the upper row on the righthand end of the scale are designated "Efficiency %" and those of the lower row for the whole length of scale are designated "Lbs. of water evaporated from and at 212° F. per lb. of fuel."

The scale may be extended to the left so as to include all factors of evaporation on left hand end of the scale, doing away with the middle row of figures on the right, the same extension enabling the figures denoting "Lbs. of water evaporated from and at 212° F." to be repeated below 10 at the left hand end of the scale.

Figure 4:
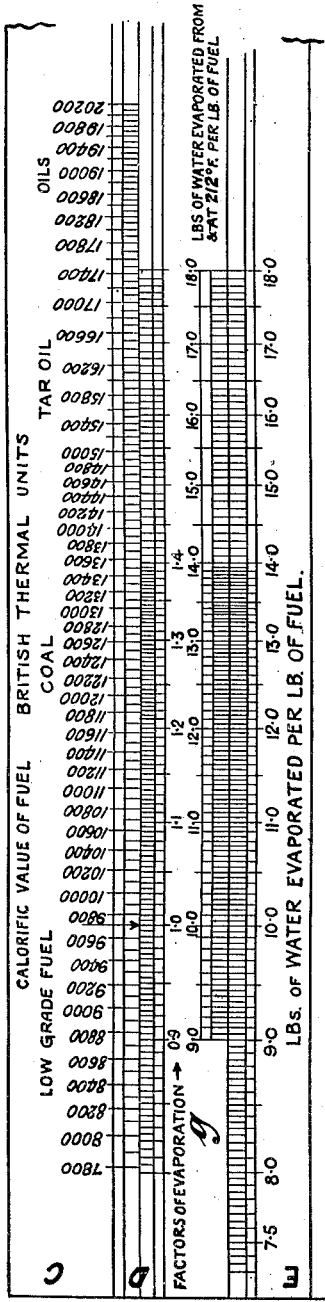
Fig. 4 is a detail view of one end of the top sliding scale drawn to an enlarged scale showing modified markings.
Figure 5:
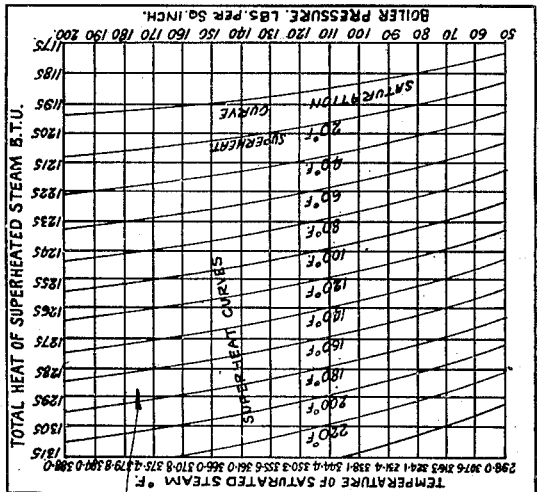

To enable readings of the latter quantity to be taken when more than 10, the scale may be projected to the lower edge of the slide C at left hand end and a further fixed scale E of similar divisions placed below C and designated "Lbs. of water evaporated per lb. of fuel." Such an arrangement is shown in Fig. 4 drawn to an enlarged scale.

Above slide D and parallel to it is a fixed scale C which is also a logarithmic scale. At its left hand end it is designated "Calorific value of fuel," the marks on the extreme left of the scale being designated "Coal B. T. U.", and those a little further to the right being designated "Oil B. T. U.," while in Fig. 4 the scale is shown extended to the left so as to include low grade fuel. From about the centre, and to the extreme right, the marks on scale D are designated "Lbs. of water evaporated per lb. of fuel."

The apparatus as herein described and illustrated is graduated in the pound Fahrenheit system of units, but is not necessarily confined to this system. It may be graduated in the gramme-centigrade or any other system.

The method of using the apparatus is as follows: The chart F, is moved until the edge of slide A lies along the line of the chart representing the observed boiler pressure. Scale A is then moved until the point representing the observed temperature of feed water is over the point on the chart where the curve representing the observed degree of superheat intersects the pressure line; or, if the steam is not superheated over the point of intersection of the saturation curve and the pressure line. The pointer $f$ will then be opposite the point on scale B which represents the factor of evaporation for the conditions under consideration.

Scale D is now moved until the mark upon it denoting the ascertained factor of evaporation is in line with pointer "$a$" or "$b$" on scale C. Then, the number of lbs. of water evaporated per lb. of fuel being known, the point representing this number is found on scale C, and will be in line with the mark on scale D denoting the lbs. of water evaporated from and at 212° F. per lb. of fuel.

The scale D is again moved until the mark denoting lbs. of water evaporated from and at 212° F. per lb. of fuel is in line with the mark on scale C denoting the calorific value of the fuel. Either pointer $a$ or pointer $b$ on scale C will then be opposite the mark on scale D denoting the required thermal efficiency.

A concrete example of using the apparatus will now be explained assuming the readings taken from a boiler plant to be as follows:—

Boiler pressure _____ 180 lbs. per sq. in.
Temperature of feed water econoizers _____ 100° F.
Temperature of superheated steam _____ 480° F.
Water evaporated per lb. of fuel _____ 7.5 lbs.
Calorific value of fuel ___ 12800 B. T. U.

Move the chart F until the 180 lbs. pressure line lies along the inside edge of the scale A. At the left hand end of the 180 lbs. pressure line is found the temperature in F. of saturated steam at the pressure, viz 379.8° F. Deduct this figure from the observed temperature of superheated steam thus, 480—379.8=100.2. Therefore the degrees of superheat are 100.2.

Neglecting the decimal figure, find the 100° F. superheat curve and move slide A until the mark indicating the temperature of the feed water i. e. 100° F. is over this curve. The arrow-head $f$ on slide A will now be pointing to 1.223 on the scale B which is the factor of evaporation.

Move slide D to the left until the factor 1.223 is under the arrow-head at left hand end of scale C.

The water evaporated from and at 212° F. can now be read off on scale D, opposite the mark on scale C indicating 7.5 lbs. of water evaporated per lb. of fuel. It will be 9.17 lbs.

Now look for the 12800 British thermal units mark on the left hand of scale C and move slide D further to the left until the 9.17 mark just obtained is opposite this B. T. U. line. The arrow head on left of scale C will then be opposite 69.5 on slide D, which is the required thermal efficiency.

This invention provides a new and novel method of determining the thermal efficiency of a steam generating plant from the observations and readings commonly taken for the purpose by the use of a chart inscribed with lines and curves representing certain physical quantities arranged underneath and capable of being moved at right angles to graduated slides either in the manner described above or in some similar manner substantially as above without reference to the precise order or size of the scale.

Curves representing the moisture percentage of steam may be provided on the chart if desired.

What we claim is:—

Computing apparatus comprising in combination, a frame provided with a fixed scale representing factors of evaporation, corrected for superheat, a sliding scale on said frame having a pointer moving along a fixed scale and scaled to represent temperature of feed water, a chart slidably mounted in the frame at right angles to the sliding scale and coacting with the same, said chart having steam curves thereon representing the point of saturation and total heat of superheated steam, and scales representing the boiler pressure and temperature of saturated steam, the arrangement being such that given the temperature of the feed water and steam together with the boiler pressure, the factor of evaporation can be obtained, substantially as described.

In witness whereof we have hereunto set our hands in the presence of two witnesses.

J. CROMPTON.
WILLIAM GALLAGHER.

Witnesses:
H. JUNCA,
A. HARRIS SEWLE.